United States Patent [19]

Hamilton

[11] 4,450,609

[45] May 29, 1984

[54] METHOD OF INSTALLING A CAMSHAFT

[76] Inventor: Steven P. Hamilton, 1506 Lakeside La., Huntington Beach, Calif. 92648

[21] Appl. No.: 467,960

[22] Filed: Feb. 18, 1983

Related U.S. Application Data

[63] Continuation-in-part of Ser. No. 304,015, Sep. 21, 1981, abandoned, which is a continuation-in-part of Ser. No. 108,485, Dec. 31, 1979, abandoned.

[51] Int. Cl.³ .............................................. B23P 15/00
[52] U.S. Cl. ............................ 29/156.4 R; 29/402.08; 29/423; 29/433; 29/464; 74/567; 206/318; 206/403; 206/446
[58] Field of Search .................. 29/156.4 R, 241, 433, 29/464, 467, 468, 423, 402.08; 74/567; 206/318, 446, 403, 335

[56] References Cited

U.S. PATENT DOCUMENTS

| | | | |
|---|---|---|---|
| 973,607 | 10/1910 | Wright | 206/446 X |
| 1,435,311 | 11/1922 | Knight | 206/446 X |
| 1,789,546 | 6/1931 | Gunnell | 206/318 |
| 2,858,014 | 10/1958 | Koziol | 206/446 X |
| 3,110,095 | 11/1963 | Peick | 29/464 X |
| 3,294,225 | 12/1966 | Kenyon | 206/446 |
| 3,740,825 | 6/1973 | Buyken et al. | 29/443 |
| 4,158,407 | 6/1979 | Rest | 206/318 |

Primary Examiner—Charlie T. Moon
Assistant Examiner—Ronald S. Wallace
Attorney, Agent, or Firm—Edgar W. Averill, Jr.

[57] ABSTRACT

An improved camshaft having a plurality of journals with a removable sleeve positioned between at least one set of adjacent camshaft bearing journals. The sleeve has an outer surface which does not extend past the outer surface of the two adjacent journals and presents a continuous cylinder spanning the space between adjacent cam bearings thereby assisting in the insertion of the camshaft into an engine. After insertion into the engine, the sleeve is removed.

3 Claims, 11 Drawing Figures

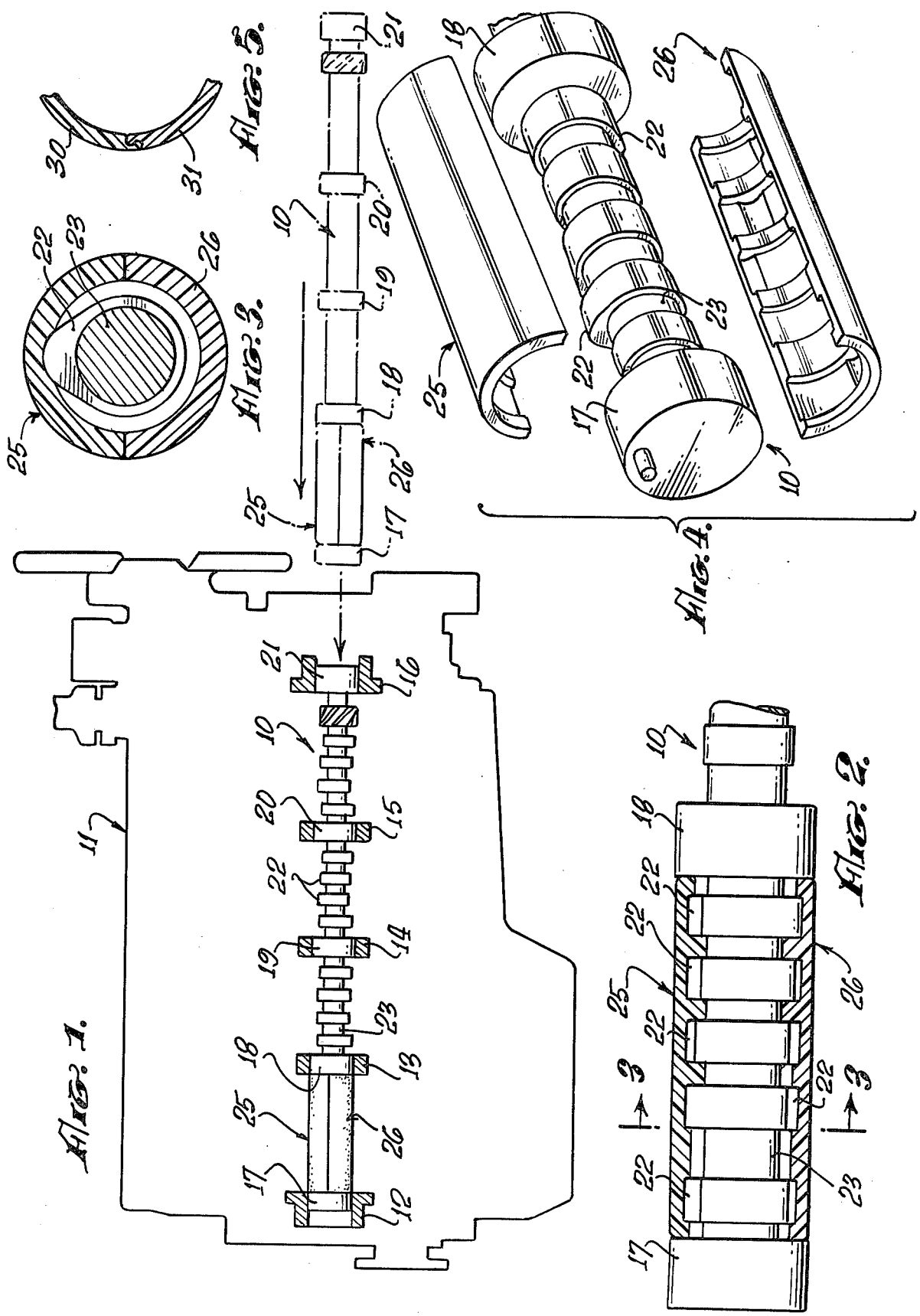

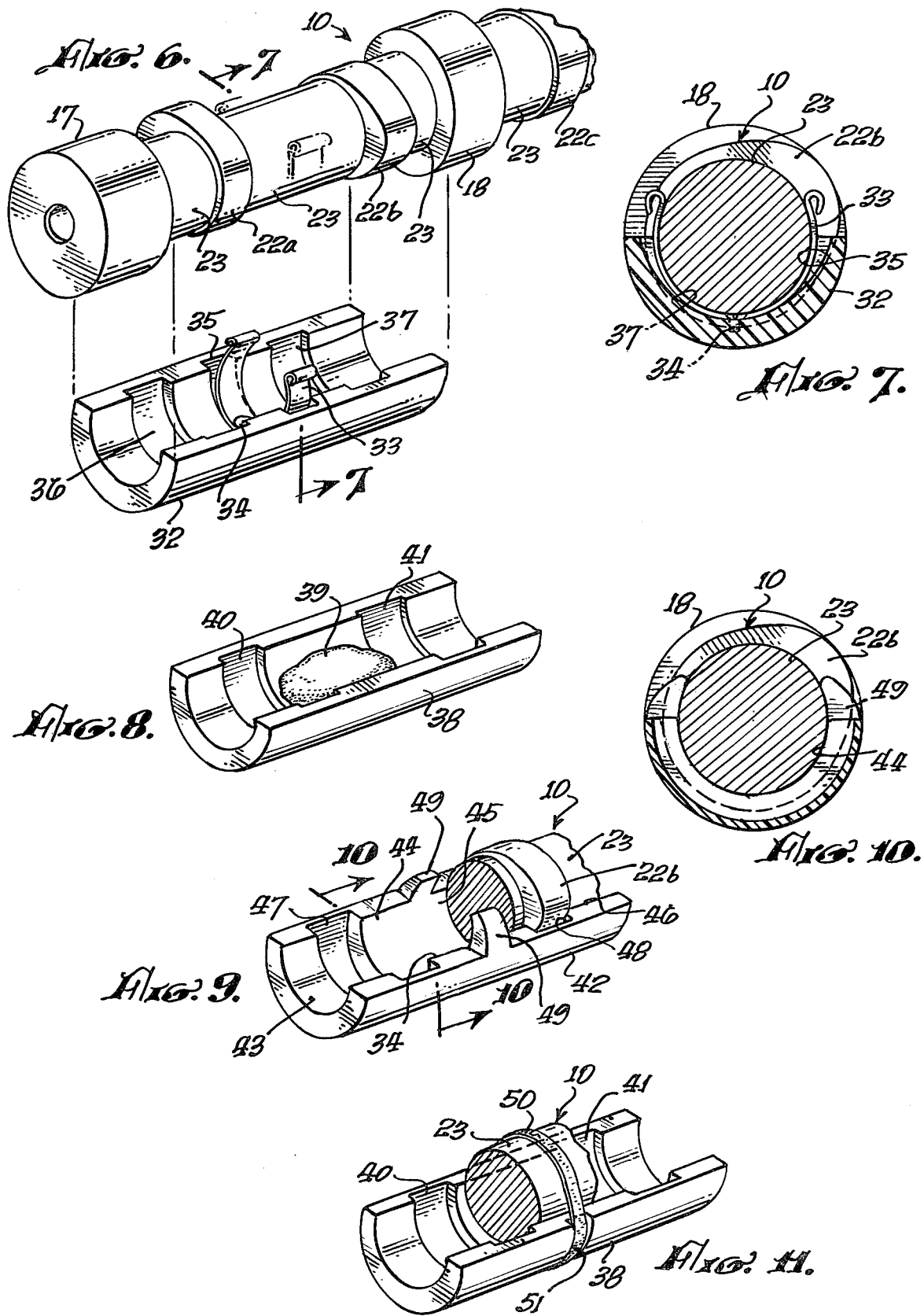

4,450,609

METHOD OF INSTALLING A CAMSHAFT

CROSS REFERENCE TO RELATED APPLICATIONS

This application is a continuation-in-part of applicant's application Ser. No. 304,015, filed Sept. 21, 1981, now abandoned, which, in turn, was a continuation-in-part of applicant's application Ser. No. 108,485 filed Dec. 31, 1979, now abandoned.

BACKGROUND OF THE DISCLOSURE

The field of the invention is camshafts of the type used in automotive or truck engines and the invention relates more specifically to tools for facilitating the insertion of camshafts during the repair or rebuilding of an engine.

During the process of inserting a camshaft into an engine and especially during the insertion of a camshaft in a large diesel engine, there is a likelihood that one or more of the camshaft bearings will be damaged by contact with one of the camshaft lobes. The camshaft is fabricated from steel and the bearing material, being much softer than steel, is easily nicked if one of the lobes is permitted to drop against the bearing. Since a diesel camshaft can weight in excess of 100 pounds and is generally inserted horizontally during most replacement operations, it is difficult to hold the camshaft along the exact axial line of the bearings so that there would be no inadvertent contact between a camshaft lobe and a camshaft bearing. A second mechanic is usually necessary to support the camshaft and even then damage to the bearings is quite likely. Furthermore, the possibility of injury to the mechanic's hand is always present during this insertion.

SUMMARY OF THE INVENTION

It is thus an object of the present invention to provide a device for facilitating the insertion of a camshaft into an engine and reducing the likelihood that the camshaft bearings will be damaged by contact with the lobes of the camshaft.

The present invention is for an improved camshaft of the type having a plurality of journals. The improved camshaft has a removable sleeve positioned between at least one set of adjacent journals. The outer surface of the sleeve does not extend past the imaginary cylinder formed by joining the outer surfaces of the two adjacent journals. The sleeve is supported by the portion of the camshaft positioned between the two adjacent journals. The sleeve has at least a portion of its outer surface lying along a line parallel to the axis of the camshaft positioned near the imaginary cylinder so that the camshaft may be inserted through a plurality of camshaft bearings while being supported by the sleeve thereby reducing the possibility that the camshaft bearings will be damaged by contact with one or more of the camshaft lobes. After the camshaft has been inserted, the sleeve is removed and discarded or saved for future use. The present invention is also for the method of using the tool described herein.

BRIEF DESCRIPTION OF THE DRAWINGS

FIG. 1 is a side-elevational view of the improved camshaft of the present invention inserted in an engine shown in phantom lines.

FIG. 2 is an enlarged fragmentary view of one end of the improved camshaft of FIG. 1.

FIG. 3 is a cross-sectional view taken along line 3—3 of FIG. 2.

FIG. 4 is a fragmentary exploded perspective view of the portion of the camshaft shown in FIG. 2.

FIG. 5 is a cross-sectional fragmentary view of a portion of an alternate configuration of the sleeve portion of the camshaft of FIG. 1.

FIG. 6 is an exploded perspective view showing one end of the camshaft of the present invention.

FIG. 7 is a cross-sectional view taken along line 7—7 of FIG. 6.

FIG. 8 is a perspective view of an alternate embodiment of the sleeve of the camshaft of FIG. 6.

FIG. 9 is a perspective view of an alternate embodiment of the sleeve of the camshaft of FIG. 6.

FIG. 10 is a cross-sectional view taken along 10—10 of FIG. 9.

FIG. 11 is a perspective view of an alternate configuration of the camshaft and sleeve assembly of FIG. 6.

DESCRIPTION OF THE PREFERRED EMBODIMENTS

Referring to FIG. 1, a camshaft, generally indicated by reference character 10, is shown inserted in engine 11. Engine 11 is shown in phantom lines and the camshaft before insertion is also shown in phantom lines to the right of engine 11. After insertion, the camshaft is supported by camshaft bearings 12–16 which hold journals 17–21 of the camshaft 10. Camshaft lobes, indicated by reference 22, are conventional and positioned between the journals. The central shaft of camshaft 10 is indicated by reference character 23.

A first embodiment of the sleeve which facilitates the insertion of the camshaft has an upper half 25 and a lower half 26. The sleeve shown in the drawings has a cylindrical outer surface which is only slightly smaller in outside diameter than the outside diameter of the journals. The outside diameter of the sleeve should not be so large that it will bind in any of the camshaft bearings but should be large enough so that it covers the outside of each of the camshaft lobes. As is evidenced from FIG. 1 of the drawings, the camshaft having a sleeve comprised of sleeve halves 25 and 26 may be readily inserted through camshaft bearing 16 and after journal 17 has passed through camshaft bearing 16, the camshaft will be supported by lower sleeve half 26 until journal 17 has entered camshaft bearing 15. Similarly, lower half 26 will support the camshaft in camshaft bearing 15 until journal 17 has entered camshaft bearing 14. Although it is possible that each section of the camshaft may be protected by a sleeve, for some camshaft designs, the most important portion for protection is the first space equivalent to that shown in FIG. 1 between journals 17 and 18. Since this one sleeve will support that end of the camshaft which is inserted first into the engine, the other end of the camshaft, namely the end adjacent journal bearing 21 may, for some camshaft designs, be readily supported by the mechanic who is inserting the camshaft. Whether or not a single sleeve will support the leading end of the camshaft depends on the relative spacing between the journals on the camshaft. If the spacing is non-proportional and the distance between the first and second journals is shorter than the distance between another adjacent pair of journals, it is preferable to at least have a sleeve between the second and third journals.

The sleeve shown in FIGS. 1 through 5 is comprised of two-half cylinders shown best in FIG. 4 of the drawings. These half cylinders have a plurality of grooves which are positioned to accept and be supported by the lobes 22 of the camshaft.

While the sleeve shown in the drawings is supported both by the camshaft lobes and the shaft, it is possible that the sleeve could be fabricated to be supported entirely by the central shaft 23 of camshaft 10. Similarly, the sleeve could be supported by the lobes alone. It is important however that the sleeve be strong enough to support the weight of the camshaft when the camshaft is being inserted. Since the sleeve is used only during insertion and is removed after the camshaft has been inserted, it may be made from a relatively inexpensive material such as acrylonitrile, butadiene, styrene, terpolymer (ABS) or other thermo-plastic material such as polyvinyl chloride, impact polystyrene, nylon or the like.

Since the sleeve is only necessary for supporting the camshaft, it is not necessary that the sleeve completely surround the camshaft as shown in the drawings. That is, the sleeve could be comprised only of lower half 26 and still function satisfactorily as long as the sleeve was positioned in the lower or underside portion of the camshaft during insertion. The sleeve may be held to the camshaft merely by friction between the sleeve and the camshaft lobes as shown in FIGS. 2 and 3. Alternatively, the sleeve can be made from two sleeve halves such as shown in FIG. 5 and indicated by reference characters 30 and 31 which snap together and are held to the shaft in that way. Alternatively, the sleeve could be snapped on to the central shaft 23. For instance, the lower half 26 could have an extension member which would snap onto shaft 23 as shown in FIG. 9 and described below. Various configurations of sleeves which comprise only half of the circumference of the shaft are shown in FIGS. 6 through 11. In FIG. 6, sleeve 32 has a spring clip 33 is held to the bottom of sleeve 32 by a screw 34. Spring clip 33 is held in a groove 35 formed along the inner surface of sleeve 32. Sleeve 32 has two lobe receiving grooves 36 and 37. As shown in FIG. 7, sleeve 32 rests against lobes 22a and 22b and thus can readily support the end of camshaft 10 as it is inserted through the bearings of the engine. Spring clip 33 snaps around the shaft 23 and holds sleeve 32 securely in place.

An alternate means of holding the sleeve to the camshaft is indicated in FIG. 8. Sleeve 38 has a quantity of grease 39 deposited in the bottom thereof and as the sleeve 38 is pressed against the camshaft, the grease is spread out into grooves 40 and 41 and forms a seal which holds the sleeve in place during installation. Whatever method is used for holding this sleeve to the camshaft, the method should be such that the sleeve is readily removable after the camshaft has been inserted in the engine. The sleeve is accessible within the engine after installation since the engine is always disassembled during this operation.

As stated above, the sleeve may either support the camshaft by contact with the lobes, by contact with the shaft or by contact with both the lobes and the shaft. The configuration shown FIG. 9 is designed to support the camshaft by contact with the central shaft 23. Thus, sleeve 42 contacts the central shaft 23 at rings 43, 44, 45 and 46. Grooves 47 and 48 permit the lobes to be accepted but do not provide support. As mentioned above, the sleeve itself can hold the camshaft and ears 49, which are an integral part of sleeve 42, grasp the shaft 23 as shown in FIGS. 9 and 10.

An alternate method of holding sleeve 38 onto a camshaft as shown in FIG. 11. A removable band 50 rests in a groove 51 formed in the outer surface of sleeve 38 and surrounds shaft 23 of camshaft 10. Band 50 may be a rubberband which is slipped over the end of the camshaft and sleeve or may be a tie band such as a wire or plastic covered wire. After the camshaft has been inserted the sleeve 38 is removed by breaking the rubberband or by untying or breaking the band. It is of course important that band 50 not extend beyond the outer surface of sleeve 38 since this fits tightly through the bearings in the engine.

The sleeve of the present invention has another benefit when it is placed on the camshaft by the manufacturer before packaging. The sleeve helps prevent the rubbing off of corrosion inhibitors during shipping and handling, reducing the possibility of rust buildup on the cam lobes.

While the sleeve halves shown in the drawings are cylindrical and slightly smaller in outside diameter than the imaginary cylinder drawn between the outer surfaces of journals 17 and 18, the outside shape of the sleeve need not be cylindrical. For instance, only a portion of the lower half of sleeve 26 need lie near the imaginary cylinder between the outer surfaces of journals 17 and 18 and the sleeve would nonetheless be functional. It is only necessary that the sleeve have a support area which prevents the lobes 22 from contacting the camshaft bearings 12 and 16. This can be accomplished by the provision of sleeves of various shapes comprising obvious variants of the cylindrical sleeve shown in the drawings. The device of the present invention greatly reduces the time it takes to install a camshaft in an engine. A time study was made testing the device of the present invention to assist in the removal of a camshaft from an engine in the horizontal position. The time to remove the camshaft with the use of the tool was thirty-five seconds, whereas without the tool the time for the task was seven minutes. It would be impractical however for one man to remove a camshaft from an engine in the horizontal position without the present tool since damage to the bearings would be almost inevitable. Thus it is common practice for two men to remove a camshaft and the time which this task takes is two minutes and thirty seconds with two men. Thus the use of the device of the present invention greatly reduces the time for camshaft removal so that the removal by one man unassisted is still far faster than the conventional method. Similarly, installation time with the device of the present invention takes one man about thirty seconds. Installation is not practical by one man without the device of the present invention and the time required for two men without the device is about two minutes and twenty seconds. In addition to the time savings there is also a safety improvement. When two men are installing or removing a camshaft, it is quite easy for the mechanic who is supporting the camshaft within the engine to injure his fingers as he is trying to hold the camshaft as it is being passed through the bearings. This is completely eliminated with the device of the present invention since it requires no internal support.

The present embodiments of this invention are thus to be considered in all respects as illustrative and not restrictive; the scope of the invention being indicated by the appended claims rather than by the foregoing description. All changes which come within the meaning and range of equivalency of the claims therefore are intended to be embraced therein.

What is claimed is:

1. A method of inserting a camshaft through a plurality of axially aligned camshaft bearings in an engine; said method including the steps of:

affixing a removable sleeve over a portion of said camshaft from the side of said camshaft between at least one set of journals on said camshaft, said sleeve having an outer surface which does not extend past an imaginary cylinder formed by joining the outer surfaces of two adjacent journals, said sleeve being supported by said portion of said camshaft between said adjacent journals and having at least a portion of its outer surface lying along the line parallel to the axis of the camshaft position near said imaginary cylinder;

horizontally orienting said camshaft with said sleeve positioned thereon in axial alignment with said plurality of camshaft bearings;

inserting a leading edge of said camshaft with said sleeve thereon through said camshaft bearings whereby vertical support is provided to said camshaft by using said portion of the outer surface of said sleeve which lies along said parallel line near said imaginary cylinder to support said camshaft as said camshaft is being inserted through said camshaft bearings so that lobes on said camshaft do not impact and damage said camshaft bearings;

laterally removing said sleeve from said camshaft once said camshaft has been inserted into said engine.

2. The method of claim 1, wherein the portion of said camshaft referred to in the affixing step is located between a leading set of adjacent journals, said leading set of adjacent journals being the first journals inserted through said camshaft bearings.

3. The method of claim 1, wherein said step of positioning said sleeve over said camshaft further includes the step of snapping together two halves of said sleeve.

* * * * *